United States Patent [19]

Miyazaki

[11] 3,935,879

[45] Feb. 3, 1976

[54] HOSE REEL DEVICE FOR FIRE EXTINGUISHING APPLIANCE
[75] Inventor: Tashirou Miyazaki, Machida, Japan
[73] Assignee: Nomi Bosaikogyo Kabushiki Kaisha, Japan
[22] Filed: Mar. 11, 1975
[21] Appl. No.: 557,290

[52] U.S. Cl. .......................................... 137/355.16
[51] Int. Cl.² .......................................... B65H 75/34
[58] Field of Search..... 137/355.12, 355.16, 355.17, 137/355.19, 355.26

[56] References Cited
UNITED STATES PATENTS
1,726,084  8/1929  Montgomery.................. 137/355.26
3,183,927  5/1965  Weese et al. .................. 137/355.19

Primary Examiner—Henry T. Klinksiek
Attorney, Agent, or Firm—Pierce, Scheffler & Parker

[57] ABSTRACT

A hose reel device for fire extinguishing appliance of the type having a cabinet and a door swingable to be horizontally opened so as to provide a vertical rotational axis for the hose reel mounted on inside of the door in opened position. The device is accordingly adapted to the use in a highway tunnel so as to be recessed into a wall portion immediately over a pedestrian inspecting passageway and is intended to provide, in case of emergency, a better mode of opening the door and a convenient reach of the operator to the device even though remaining under the passageway while permitting the hose to be run out in any direction without any conscious effort of the operator.

6 Claims, 4 Drawing Figures

HOSE REEL DEVICE FOR FIRE EXTINGUISHING APPLIANCE

BACKGROUND OF THE INVENTION

This invention relates to a hose reel device for fire extinguishing appliance, and particularly to a device of the type having a cabinet and a door which is swung about an axis horizontal and parallel to the front side of the cabinet to provide a vertical rotational axis for the hose reel mounted on inside of the door when the hose is unwound from the reel to direct the water jet to a base flame.

The purpose of the invention is to provide an everyway device which permits the hose to be run out in any direction, without any conscious effort of the operator, thereby eliminating any obstruction in winding onto or unwinding from the hose reel, particularly in a narrow way such as, for example, a highway tunnel passageway for a pedestrian inspector.

Along both sides of the road way in the highway tunnel, there is ordinarily provided the passageway adapted to the use of the pedestrian inspector of the highway. Such inspecting passageway is usually leveled by about half of a human body for safeguarding the inspector against the automobile vehicles travelling at a high speed on the road way. For normal maintenance purpose, the hose reel device is required to be recessed into the wall of a tunnel immediately over the passageway surface.

The invention therefore, further, contemplates to provide a device which permits operators to open the device door readily without stepping on the passageway, namely remaining under the passageway surface and to shift the reel into the convenient reach of the operator in case of emergency.

While various means have been employed for device which enables the operator to pull off the hose in any direction, none have proven, in our view point, to be entirely sufficient particularly in simplifying the device and accordingly in operation of the device.

SUMMARY OF THE INVENTION

A principal object of the invention is to provide an improved hose reel device which enables the hose to be run out in any direction without necessity of any complicated swinging joints.

A further object of the invention is to ensure a vertical rotational axis for the reel and to keep the reel within convenient reach of the operator remaining on the road way, under affection of center of gravity of the device in the opened position thereof.

A still further object of the invention is to provide means to keep the hose ready for jetting water, the means normally connecting the hose to the water supply source through means of a pair of fluid-tight rotatable joints disposed at the front center of the reel and on the swinging axis of the door respectively.

Thus, in the disclosed embodiment, there are comprised a cabinet, a door hinged to the cabinet to be swung about an axis horizontal and parallel to the front side of the cabinet, a reel rotatably mounted on inside of the door and a pair of rotatable and fluid-tight tubular joints connecting the hose unwoundly wound on the reel to the water supply source, one of the joints being disposed at the front center of the reel and the other one on the swinging axis of the door respectively.

This invention embodies a simple reliable everyway device which enables the hose to be run out in any direction without any conscious effort of the operator by using no complicated swinging joint for the reel.

DESCRIPTION OF THE PREFERRED EMBODIMENT

Figure 2:
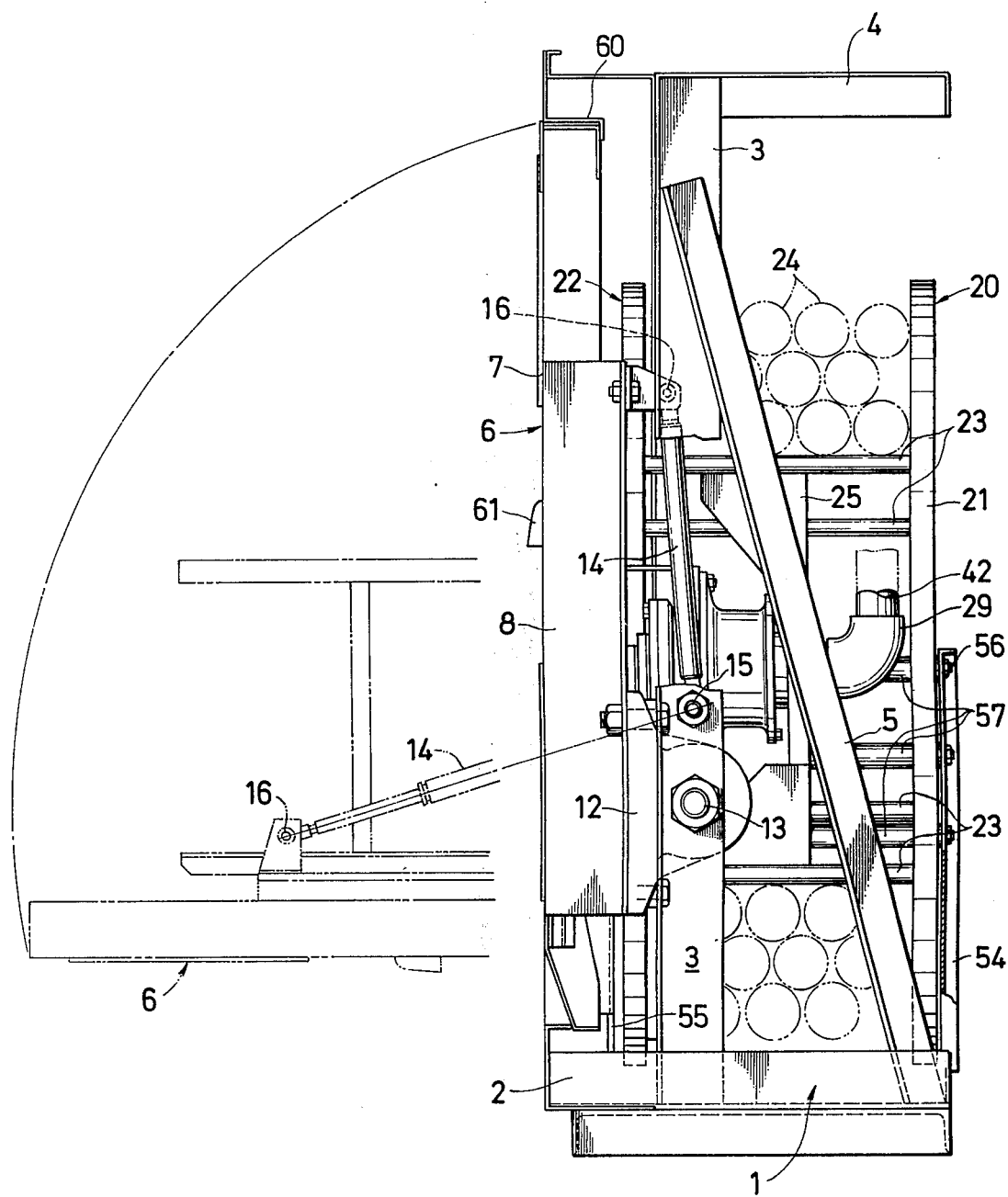
FIG. 2 is a side view of the device of FIG. 1 shown fragmentally in which the door and the reel is shown additionally in dot and lines in a opened position.

In FIG. 2, the cabinet shown generally by the numeral 1 is of frame type and is formed of a pair of parallel bottom side members 2, a pair of pillars 3 each of which is normal to the corresponding one of the bottom members, a pair of top side members 4 each of which is normal to the corresponding one of the pillars and parallel to the bottom side members. A diagonal bar 5 is in addition framed into the cabinet on each side thereof by fastening at both ends to the pillar and the bottom side member to entirely strengthen the resulting cabinet.

It should be noted that both side bottom members are connected to each other by a horizontal and lateral bar member which does not appear in the view for the sake of draftsmanship covenience. The top side members 4 are also connected each other by a horizontal and lateral bar also not shown in the view. The square type cabinet is thus formed from such formation.

The cabinet 1 is in use generally recessed into the wall with only a trim projecting from the plaster of the wall so that the door panel lies in the same plane as that of the plaster when the door is closed.

Figure 1:
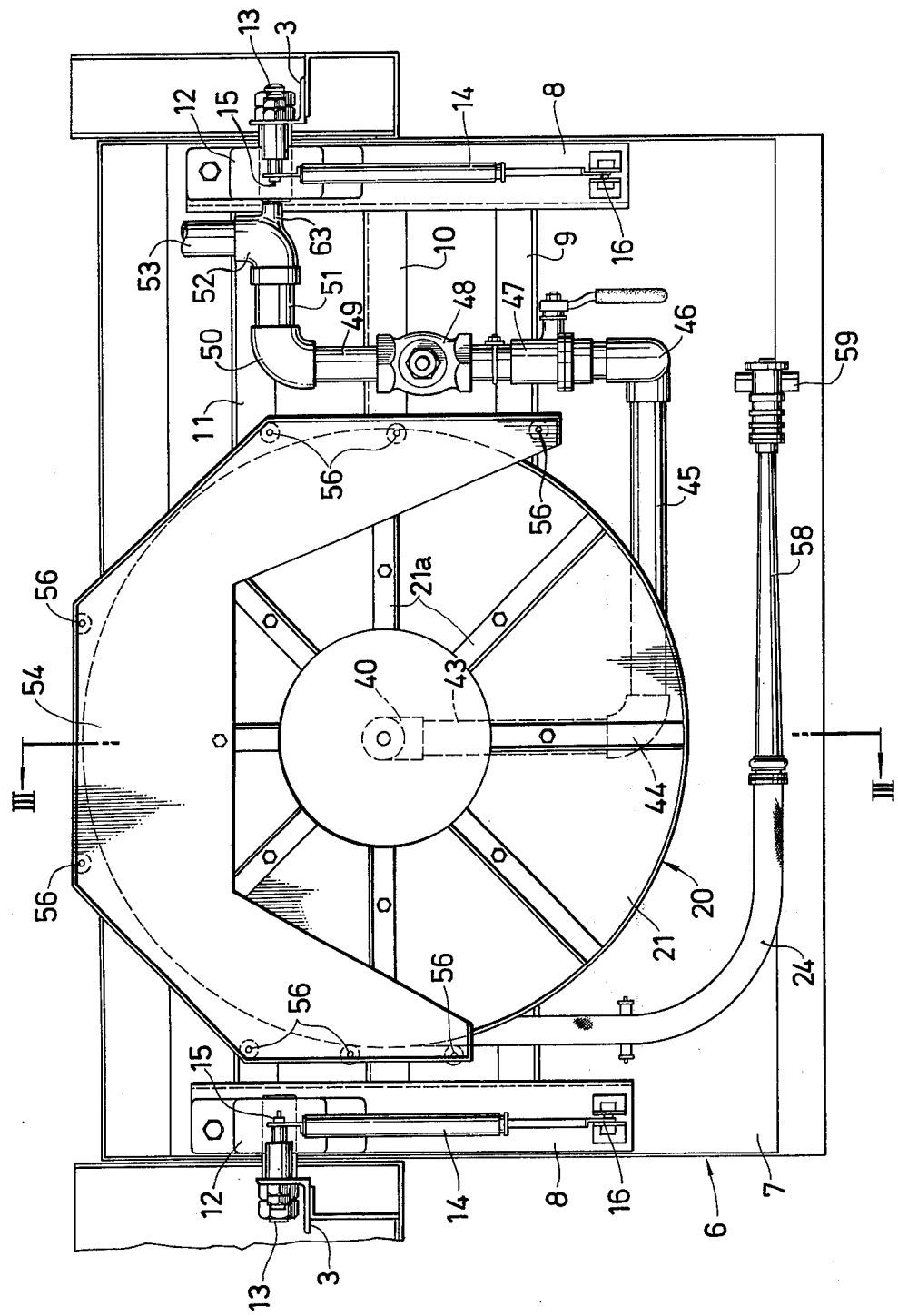
FIG. 1 is a plan view of inside of the door of the cabinet of the device accoding to the invention.

The door is generally designated by the numeral 6 in FIG. 2 and has a panel 7 at both sides of which is fastened a pair of brackets 8 as best shown in FIG. 1. Between the brackets 8 are spanned three parallel reinforcing beams 9 to 11. A hinge fitting 12 is fastened on each of the brackets 8 as best shown in FIG. 2 to provide an axis for the door by means of a pin 13. The pin 13 extends to be supported by the corresponding pillars 3. Both pins 13 are in aligned relation to each other and lie in an imaginary horizontal plane to provide a rotational axis for the door which is horizontal and parallel to the front side of the cabinet.

A damper 14 is pivotally connected at its both ends to a pin 15 on the pillar 3 and a pin 16 on the bracket 8 as best shown in FIG. 2. The damper 14 is of usual type and is so conventional that further illustration will be abbreviated. The damper further provides a stopper means for the door when the door is opened as shown in dotted lines in FIG. 2 to ensure the horizontally opened position for the door. A vertical rotational axis is thus provided for a reel 20 by being affected by the center of gravity of the door. In order to ensure for the door a snap-acting swinging motion to safely occupy either the opened or closed position, the swinging axis of the door is so positioned that the center of gravity of the door may shift beyond an imaginary vertical plane in which lies the swinging axis by opening or closing the door. Such arrangement is effective to make any conscious effort unnecessary for the operator to lock the door in the opened or closed position.

Figure 3:
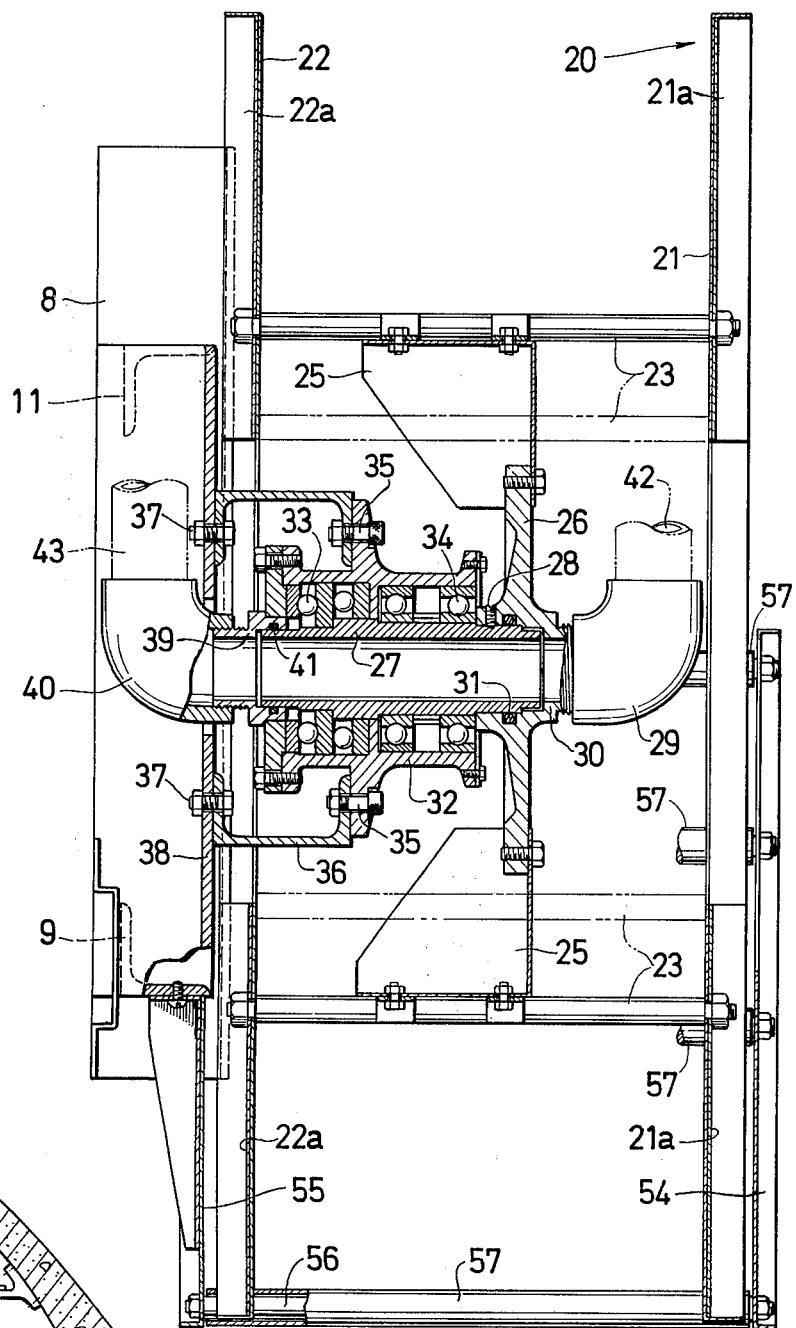
FIG. 3 is a cross sectional side view taken along the line III—III in FIG. 1.

The reel 20 has a pair of parallel doughnut shaped discs 21 and 22 as shown in FIG. 1. The discs are connected to each other by a plurality of bars 23 disposed in a circle concentric to the rotational axis of the reel 20. For reinforcing purpose, both discs are peripherally flanged and have a plurality of radius rods 21a and 22a respectively. The bars form a core onto which a hose 24 is wound as shown in dotted lines in FIG. 2. A corresponding number of radial arms 25 connect the bars to a hub 26 as shown in FIG. 3. The hub 26 is secured to a sleeve 27 by means of a set screw 28. An elbow 29 is fluid-tightly connected to a flanged portion 30 of the hub and in turn the hub is also fluid-tightly connected to sleeve 27 so that the three parts provide a fluid-tight circuit associated by a provision of a seal 31. A pillow box 32 secured on inside of the door 6 rotatably supports sleeve 27 by means of a pair of radial ball bearing 34 and thrust ball bearing 33. The pillow box is carried by the door 6 through means of bolts 35, base 36 of channel type form, bolts 37, base plate 38 and the reinforcing bar members 9 to 11.

The sleeve 27 is at its left end rotatably but fluid-tightly connected to a jointing bush 39 which is in turn fluid-tightly fastened to an elbow 40. The numeral 41 indicates a seal to prevent the water within the sleeve 27 to escape.

From the foregoing, it will be apparent that the reel 20, elbow 29, and sleeve 27 rotate in unison, being supported for rotation by the radial and thrust ball bearing within the pillow box, while jointing bush 39 and elbow 40 remain stationary with the fluid-tight connection being maintained between both of the sleeve 27 and bush 39 by means of the seal 41. The elbow 29 connects to a pipe 42 which in turn connects to hose 24 wound on the core formed of the bars 23. The elbow 40 connects to a pipe 43 suitably secured to the door 6.

Turning to FIG. 1, the pipe 43 is coonected through an elbow 44, pipe 45, elbow 46, valve 47, globe valve 48, pipe 49, elbow 50 and pipe 51 to an elbow 52. The pipe 51 and the elbow 52 are rotatably and fluid-tightly connected to provide a junction therebetween. The elbow 52 is in turn connected through a pipe 53 to a fluid supply source (not shown). The elbow 52 has a bearing 63 to receive therein the extending free end of the pin 13 so that alignment relationship is ensured in installation between the pipe 51 and the pin 13.

It should be noted that the rotatable and fluid-tight connection provided by the pipe 51 and elbow 52 otherwise may be replaced by an ordinary flexible and pressure-durable pipe in case where the device is applied under lower pressure of the water supply.

From the foregoing, it will be noted that the hose 24 wound on the reel 20 is fluidly connected to the fluid supply source through such circuit formed of the above mentioned various parts, in any rotated positions of the reel and also in either of the opened or closed position of the door 6.

The principal feature of the apparatus of the invention is based upon the fact that the door 6 is opened horizontally to have the reel on inside of the door shifted into a convenient reach of the operator and rotated around a vertical axis. The hose is accordingly enabled to be unwound by pulling in anyway without any conscious effort of the operator.

A pair of peripherally flanged cover plates 54 and 55 are suitably secured to the door 6 at the opposite sides of the reel 20 as seen in FIG. 2 and one of which is seen in the plan view of FIG. 1. The reel 20 is positioned between the cover plates with both discs thereof slightly spaced from the corresponding cover plates. Both cover plates are connected by an arcuate series of lateral bars 56 as best shown in FIG. 3. Each bar 56 rotatably carries thereon a tubular roller 57. The series of rollers 57 provide means to guide the hose for smoothly unwinding from and winding onto the reel 20.

Turning again to FIG. 1, the terminal end of the hose 24 is connected to a nozzle 58 which is in rest position releasably clamped by means of resiliently clamping means designated at 59 carried by the door.

Figure 4:
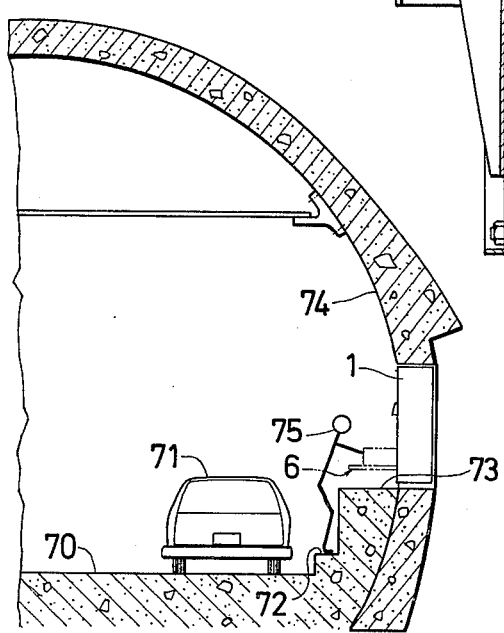
FIG. 4 is a cross sectional view of a tunnel for a highway to which the device of the invention is applied.

In FIG. 4, half of a sectional view of the tunnel is shown. In the view, the numeral 70 designates the road way on which automobile vehicles travel as illustrated at 71. A road shoulder 72 is further stepped by a passageway 73 adapted to the pedestrian use for maintenance or inspection of the highway. The passageway 73 is higher than the shoulder 72 by about half of a human body. For maintenance purpose, the cabinet of the device is required to be recessed into the wall of the tunnel with a slight trim projecting from the plaster of the tunnel wall and with its bottom disposed on a level with the passageway 73 as shown in heavy lines, diagrammatically. From the installation, the operators are obliged in an emergency to operate the device on the road shoulder 72 as shown diagrammatically at 75. The door of horizontally opening character will effectively provide for the operator in case of an emergency a better mode of operation to open the door, while permitting him to remain on the road shoulder 72. Further, the operator is enabled to pull the hose out in any direction without any conscious effort.

To use the reel, the operator simply opens the door 6 and then opens the valve 47, releasing the nozzle 58 from the clamping device 59. The operator then draws off from the reel enough hose to enable himself to get within effective striking distance of the fire, and then on arrival at the outbreak directs the water jet to a base of flame. Although jetting of water is commenced from the nozzle 58 immediately after the valve 47 is opened, the present invention is not restricted to such embodiment. An ordinary rotary nozzle valve (not shown) may be additionally provided at the nozzle 58 so that the water jetting is restrained until the rotary valve is operated by the operator to commence the jetting.

Since the hose is normally ready for fluid flowing on the reel, it is unnecessary for the operator to run out complete length of the hose before the jetting is commenced. It is accordingly much simpler for an amateur to operate the device.

As shown in FIG. 2, at its upper portion, a stopper member 60 is provided to which the door abuts when the door is closed to hold the door in the closed position under the affection of center of gravity of the door. At a central portion of the outside of the door is secured a door handle 61 to provide pulling means for the operator to open the door.

Although the invention is illustrated and described as applied to the fire extinguishing appliance in the highway tunnel, the invention is apparently able to be applied to any other device installed within the scope of the invention.

What is claimed is:

1. A hose reel device for fire extinguishing appliance of the type having a cabinet and a door, said device comprising hinge means to swingably connect the door to the cabinet for opening and closing the cabinet, said hinge means being mounted on the cabinet to provide for the door a swinging axis horizontal and parallel to the front side of the cabinet, a reel mounted on inside of the door and rotatable around an axis normal to the door, a hose wound onto the reel and fluidly connected to the water supply source and valve means controlling the water supply.

2. A hose reel device as set forth in claim 1, wherein a pair of rotatable fluid-tight joints connecting the hose on the reel to the water supply source, one of said joints being disposed at the front center of the reel and the other one being disposed on said swinging axis of the door.

3. A hose reel device as set forth in claim 1, wherein the reel has at its central portion a hub to permit the water to pass therethrough for jetting and said hub being secured on a sleeve rotatably supported, by means of a pair of radial and thrust bearings, on a pillow box secured on the inside of said door.

4. A hose reel device as set forth in claim 1, wherein an arcuate series of freely rotatable guide rollers are provided adjacent the reel to guide the hose being wound onto or unwound from the reel.

5. A hose reel device as set forth in claim 1, wherein the swinging axis of the door is so disposed that the center of gravity of the door is displaced by opening and closing thereof beyond the immaginary vertical plane in which lies the swinging axis of the door to thereby snap-actingly urge the door to either opened or closed position.

6. A hose reel device for fire extinguishing appliance of the type having a cabinet and a door, said device comprising hinge means to swingably connect the door to the cabinet for opening and closing the cabinet, said hinge means being mounted on the cabinet to provide for the door a swinging axis horizontal and parallel to the front side of the cabinet, a reel mounted on inside of the door and rotatable around an axis normal to the door, a hose unwoundly wound onto the reel and fluidly connected to the water supply source, valve means controlling the water supply, a pair of rotatable fluid-tight joints for connecting the hose to the water supply source, one of said joints being disposed at the front center of the reel and the other one being disposed on said swinging axis of the door, said reel having at the central portion thereof a hub to permit the water supply to pass therethrough, said hub being secured on a sleeve rotatably supported by means of a pair of radial and thrust bearings, on a pillow box secured on the inside of said door; and an arcuate series of freely rotatable guide rollers arranged around the reel to guide the hose, the swinging axis of the door being so disposed that the center of gravity of the door is displaced by opening and closing the door beyond the imaginary vertical plane in which lies the swinging axis to thereby snap-actingly urge the door to either opened or closed position.

* * * * *